US008891928B2

(12) United States Patent
Marmon et al.

(10) Patent No.: US 8,891,928 B2
(45) Date of Patent: Nov. 18, 2014

(54) FIBER OPTIC SPLICE ENCLOSURES HAVING INTERCHANGEABLE ENDPLATE ASSEMBLIES AND METHODS INCLUDING THE SAME

(75) Inventors: Thomas Ross Marmon, Angier, NC (US); Roy Keller Thompson, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 279 days.

(21) Appl. No.: 13/404,970

(22) Filed: Feb. 24, 2012

(65) Prior Publication Data
US 2012/0230644 A1    Sep. 13, 2012

Related U.S. Application Data (60) Provisional application No. 61/449,941, filed on Mar. 7, 2011.

(51) Int. Cl.
G02B 6/00 (2006.01)
G02B 6/44 (2006.01)

(52) U.S. Cl.
CPC ............. G02B 6/444 (2013.01); G02B 6/4455 (2013.01)
USPC ........................................ 385/135

(58) Field of Classification Search
None
See application file for complete search history.

(56) References Cited

U.S. PATENT DOCUMENTS 5,093,885 A * 3/1992 Anton ......................... 385/134
5,313,546 A * 5/1994 Toffetti ........................ 385/135
5,737,475 A * 4/1998 Regester ...................... 385/134
5,886,300 A   3/1999 Strickler
6,118,076 A * 9/2000 Damm et al. .............. 174/77 R
6,315,598 B1 * 11/2001 Elliot et al. .................. 439/456
6,533,472 B1   3/2003 Dinh et al.
2002/0064363 A1   5/2002 Grubish et al.
2006/0083475 A1   4/2006 Grubish et al.
2007/0183732 A1 * 8/2007 Wittmeier et al. ........... 385/135
2008/0205843 A1 * 8/2008 Castonguay et al. ......... 385/135
2009/0152004 A1   6/2009 Bonvallat et al.
2011/0129186 A1 * 6/2011 Lewallen et al. ............. 385/59
2012/0257862 A1 * 10/2012 Deel et al. ..................... 385/92
2012/0308189 A1 * 12/2012 Kimbrell et al. ............. 385/135

FOREIGN PATENT DOCUMENTS

EP          0320236 A2 *   6/1989
FR          2 660 118 A1    9/1991
WO     WO 2012/158233 A1 * 11/2012

OTHER PUBLICATIONS

International Preliminary Report on Patentability corresponding to International application No. PCT/US2012/026513; Date of Mailing: Sep. 19, 2013, 8 pages.
Notification of Transmittal of the International Search Report and the Written Opinion of the International Searching Authority, or the Declaration in corresponding PCT Application No. PCT/US2012/026513 mailed Jun. 18, 2012 (13 pages).

(Continued)

Primary Examiner — Mike Stahl
(74) Attorney, Agent, or Firm — Merchant & Gould, P.C.

(57) ABSTRACT

A fiber optic splice enclosure system includes an enclosure and first and second endplate assemblies. The enclosure defines an enclosure chamber. The first and second endplate assemblies are adapted to be interchangeably mounted on the enclosure to provide different respective configurations for connecting fiber optic cables to the enclosure.

14 Claims, 7 Drawing Sheets

(56) References Cited

OTHER PUBLICATIONS

"FOSC 450 Gel-Sealed Fiber Optic Splice Closure Ordering Guide" Tyco Electronics Corporation, ©2004-2009 1654571 F429.11/09 (32 pages).

"FOSC 600 C and D Fiber Optic Splice Closure Installation Instruction" Tyco Electronics Corporation, ©2003, 2008 PML MP0310 F392.04/08 (15 pages).

"FOSC 600 Fiber Optic Splice Closure" Tyco Electronics Corporation, ©2005, 2008 F382.06/08 (2 pages).

* cited by examiner

FIBER OPTIC SPLICE ENCLOSURES HAVING INTERCHANGEABLE ENDPLATE ASSEMBLIES AND METHODS INCLUDING THE SAME

RELATED APPLICATION(S)

The present application claims the benefit of and priority from U.S. Provisional Patent Application No. 61/449,941, filed Mar. 7, 2011, the disclosure of which is hereby incorporated herein by reference in its entirety.

FIELD OF THE INVENTION

The present invention relates to communication cable termination systems and, more particularly, to optical fiber termination systems and methods for storing and terminating the same.

BACKGROUND OF THE INVENTION

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location, for example. A trunk or main cable may be routed, for example, through a housing subdivision and small fiber count branch or drop cables may be spliced to the main cable at predetermined spaced apart locations.

A typical main cable may be installed underground and have multiple drop cables connected thereto, each of fifty feet or more. Each of the drop cables, in turn, may be routed to an optical network unit (ONU) serving several homes. Information may then be transmitted optically to the ONU, and into the home, via conventional copper cable technology or optically via optical fiber extending all the way to the home. Alternatively, the drop cables may be routed directly to the house (ONT). Thus, the drop cables may serve groups of users, although other architectures may also employ a main cable and one or more drop cables connected thereto.

SUMMARY OF THE INVENTION

According to embodiments of the present invention, a fiber optic splice enclosure system includes an enclosure and first and second endplate assemblies. The enclosure defines an enclosure chamber. The first and second endplate assemblies are adapted to be interchangeably mounted on the enclosure to provide different respective configurations for connecting fiber optic cables to the enclosure.

According to method embodiments of the present invention, a method for using a fiber optic splice system includes providing a fiber optic splice enclosure system including an enclosure and first and second endplate assemblies. The enclosure defines an enclosure chamber. The first and second endplate assemblies are adapted to be interchangeably mounted on the enclosure to provide different respective configurations for connecting fiber optic cables to the enclosure. The method further includes: selecting one of the first and second endplate assemblies; and mounting the selected one of the first and second endplate assemblies on the enclosure.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Some embodiments of the present invention provide an enclosure system for use with fiber optic cabling. The enclosure system may make it easier to access and splice fibers running to living units or other customer locations at or near the end of fiber runs.

In some embodiments, the enclosure system includes an enclosure including some and/or all of the following features. The enclosure system may include an enclosure containing entry and/or egress points for fiber optic cables. One entry point may be used for an entering cable (feeder), one or more entry points may be used for branch and/or drop cable(s) exit, and a third may be used for exiting feeder (express) cable. The enclosure system may be a multi-drop or tap-off closure.

According to some embodiments of the present invention, a pass through fiber optic closure is provided. The closure is configured to receive a segment of a fiber optic cable, such that fibers thereof are expressed (uncut) through the closure without severing a buffer tube or buffer tubes of the cable segment (i.e., one or more of the buffer tubes are expressed through the closure). According to some embodiments of the present invention, an outer protective buffer tube of the cable segment extends fully and continuously through the closure.

According to embodiments of the present invention, a telecommunications fiber optics splice enclosure is configurable for different fiber drop types by having changeable endplates to accommodate different methods for terminating a fiber drop cable. The enclosure can be configured for different fiber drop types simply by changing the drop cable endplate to a different or alternative type or configuration. This can be accomplished in the factory or in the field. The enclosure can thus be assembled to accommodate field splice or field terminated drop cables in one configuration, or assembled to accommodate factory terminated, hardened fiber optic drops in an alternative configuration. Embodiments of the invention allow for a single enclosure type to be configurable for multiple drop cable types using the basic enclosure for either application. This limits the need for complete tooling for two separate enclosures. It also allows the enclosure to be configurable and reconfigured in the field.

Figure 1:
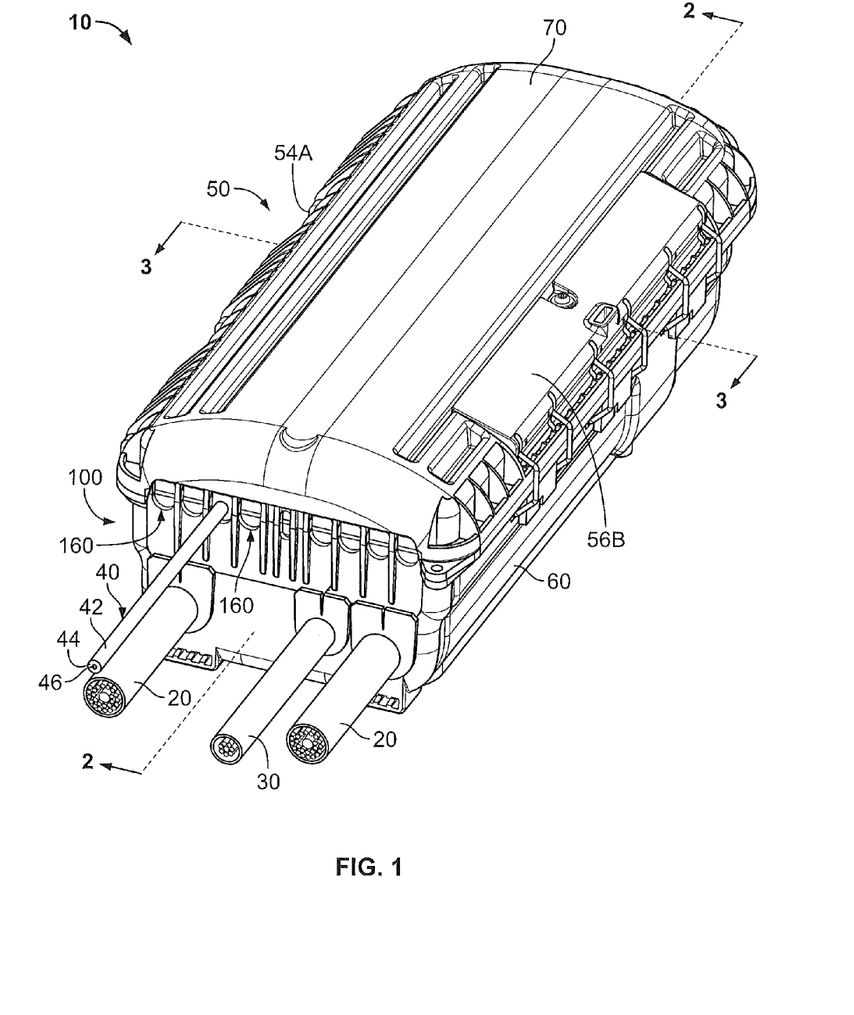
FIG. 1 is a front perspective view of a multi-drop closure system according to embodiments of the present invention with a first endplate configuration.

Embodiments of the present invention will now be further described with reference to FIGS. 1-7. A multi-drop enclosure system 10 for coupling an optical fiber branch cable 30 and/or optical fiber drop cables 40 to an optical fiber main cable 20 at a termination point to form a splice connection assembly is shown in FIGS. 1 and 5. The system 10 includes an enclosure 50. The optical fiber main cable 20 may be, for example, a feed from a service provider central office intended to provide service to individual subscriber locations in various locations in the field. The termination point may be positioned in the proximity of a neighborhood or the like and the branch cable 30 and the drop cables 40 may deliver an optical fiber connection to the subscriber location and/or to a junction box or the like where, for example, a copper connection may be routed for the last leg to the subscriber location. Alternatively, drop cables 40 may be routed directly from the enclosure system 10 to the subscriber location (e.g., house). The portion of the cable 20 shown in the figures corresponds to a termination point, where a splice may be made to the main cable 20, and it will be understood that there are typically branch and drop cables spliced to the main cable 20 at a plurality of longitudinally displaced termination points selected to be positioned at desired locations in the field, such as in a neighborhood or the like.

Figure 3:
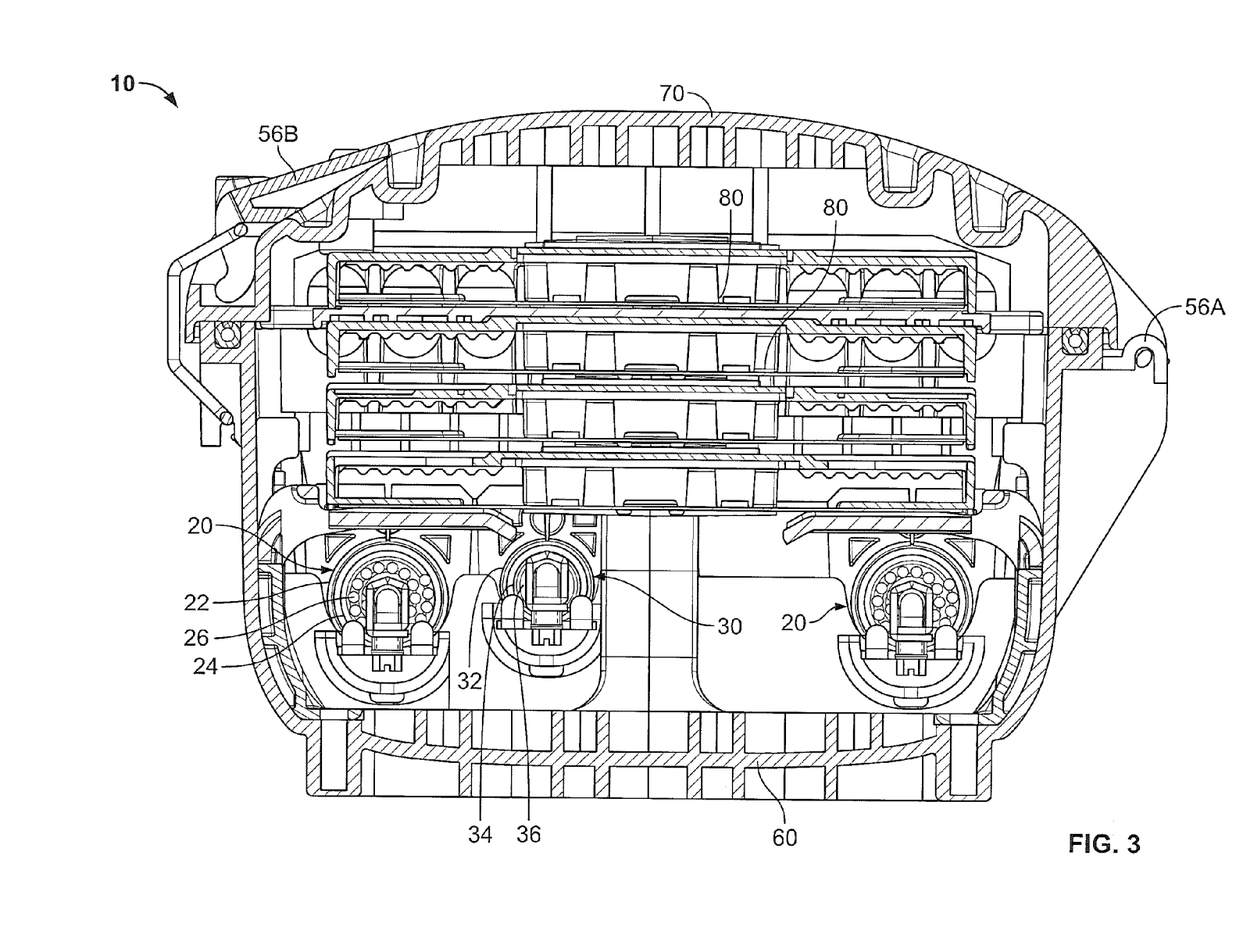
FIG. 3 is a cross-sectional view of the multi-drop closure system of FIG. 1 taken along the line 3-3 of FIG. 1, with the first endplate configuration.

With reference to FIG. 3, the illustrated optical fiber main cable 20 includes a cable jacket 22 surrounding a plurality or bundle of buffer tubes 24, and one or more optical fibers 26 extending through each buffer tube 24. The cable 20 may including further components such as a tubular metal grounding shield, or one or more strength members. According to other embodiments, the cable 20 may include one or more fiber optic ribbons surrounded by a jacket. It will be appreciated that the description herein regarding routing, placement and organizing of the buffer tubes 24 likewise applies to fiber optic ribbons. However, in the case of a fiber optic ribbon cable, the buffer tube thereof typically will be severed to expose all of the ribbons rather than expressed through the enclosure 50.

Referring to FIG. 3, the branch cable 30 may include an outer jacket 32, one or more buffer tubes 34 extending longitudinally through the outer jacket 32, and one or more optical fibers 36 (typically, a plurality, e.g., seventy-two) extending through the buffer tube(s) 34. The fibers 36 may be grouped in respective buffer tubes 34. For example, in a seventy-two fiber cable 30, there may be six buffer tubes 34 with twelve fibers 36 in each buffer tube 34. According to other embodiments, the cable 30 may include one or more fiber optic ribbons surrounded by a jacket and a buffer tube. It will be appreciated that the description herein regarding routing, placement and organizing of the buffer tubes 34 likewise applies to fiber optic ribbons.

Each drop cable 40 (FIG. 1) may likewise include an outer jacket 42, a buffer tube 44 extending longitudinally through the outer jacket, and one or more optical fibers 46 extending through the buffer tube 44.

Figure 5:
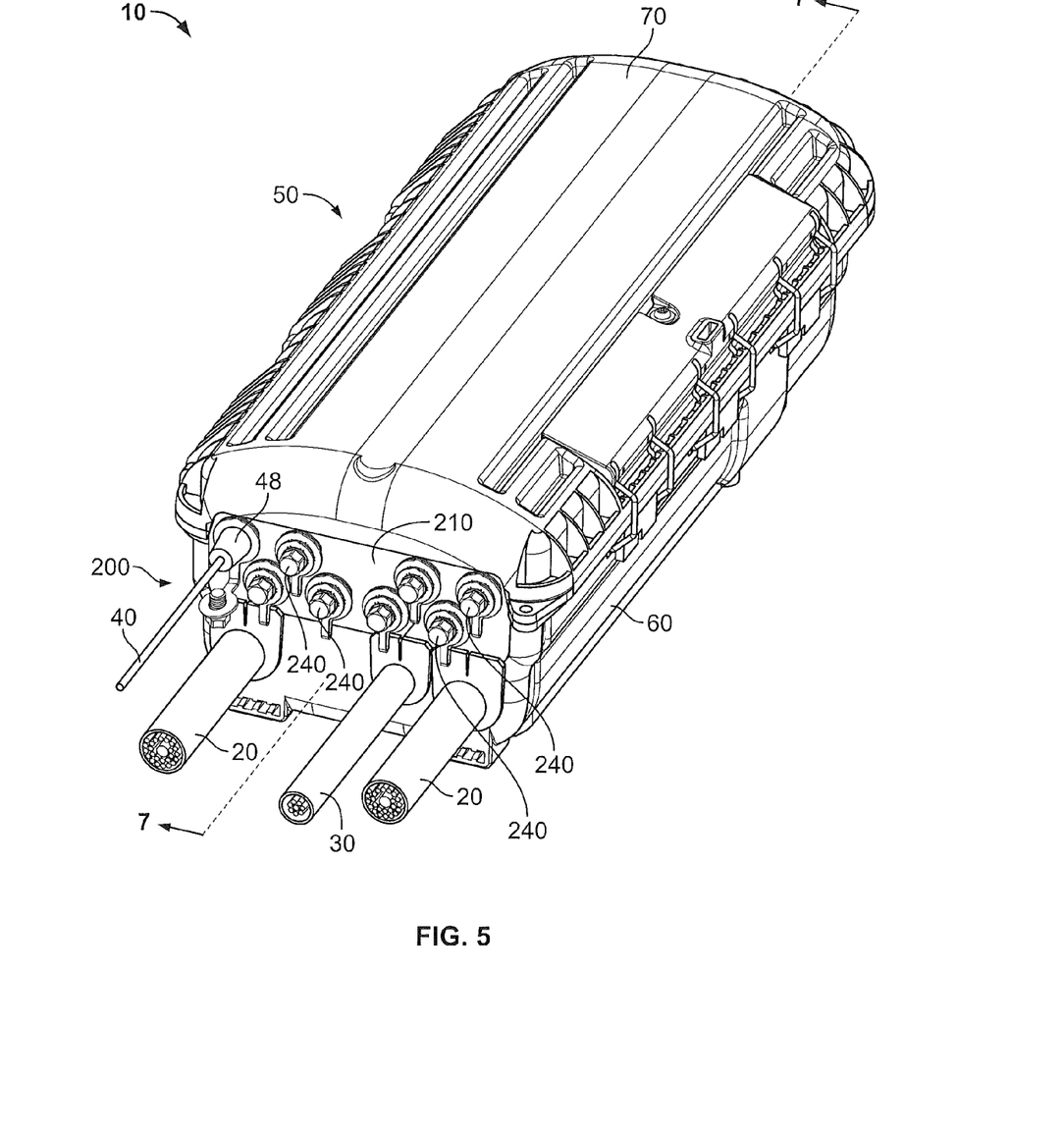
FIG. 5 is a front perspective view of the multi-drop closure system of FIG. 1 with a second endplate configuration.
Figure 6:
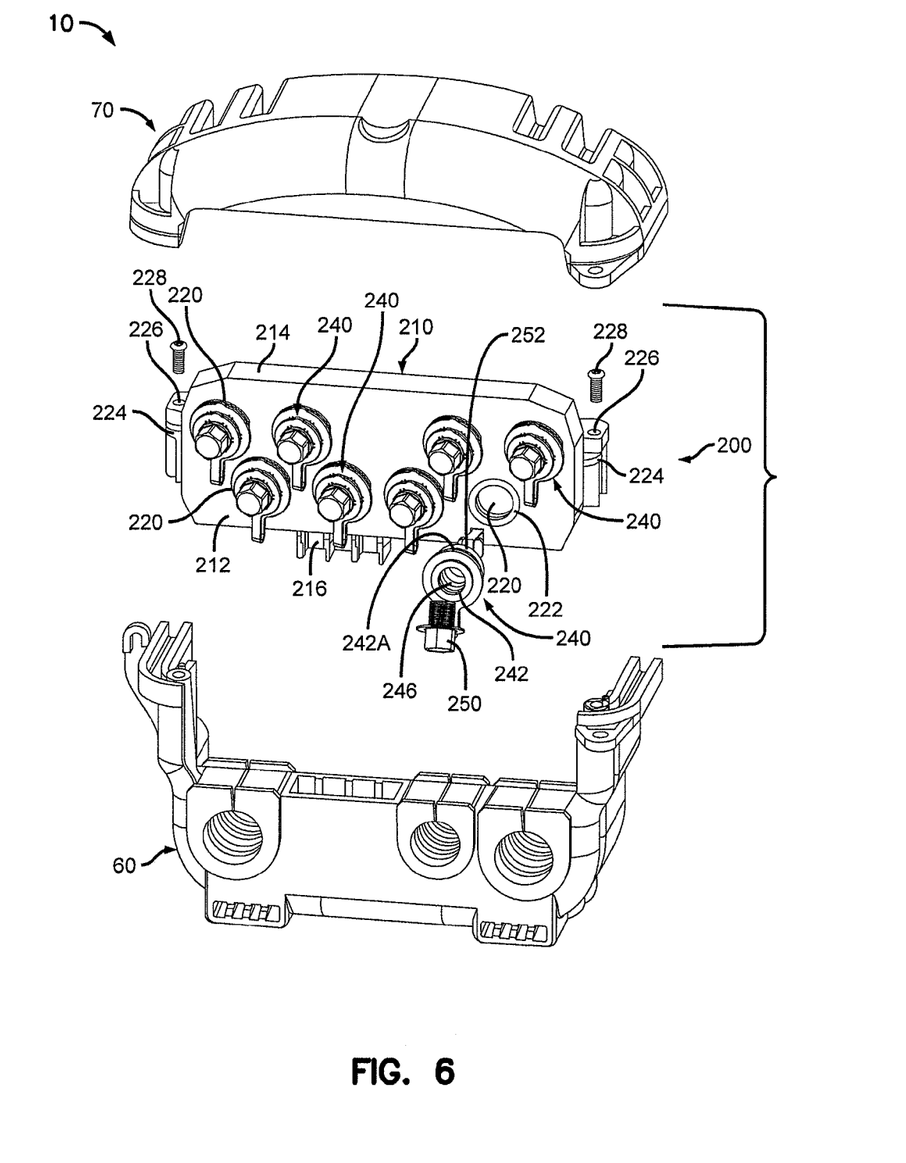
FIG. 6 is an exploded, fragmentary, perspective view of the multi-drop closure system of FIG. 1, with the second endplate configuration.
Figure 7:
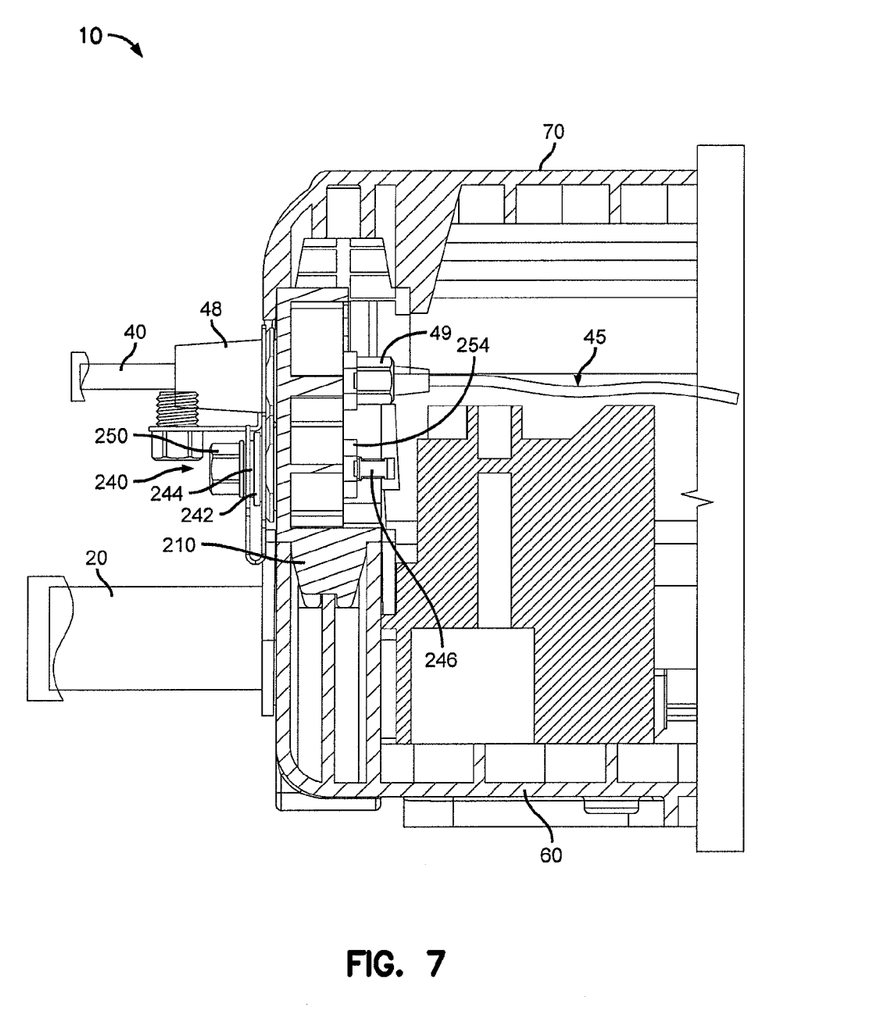
FIG. 7 is an enlarged, fragmentary, cross-sectional view of the multi-drop closure system of FIG. 1 taken along the line 7-7 of FIG. 5, with the second endplate configuration.

The fiber optic enclosure system 10 includes an enclosure 50, one or more splice trays 80 (FIGS. 2 and 3), a tray tower 82, grommets 54, and interchangeable end wall or endplate assemblies 100 (FIGS. 1, 2 and 4) and 200 (FIGS. 1-7). The system 10 may further include a fiber optic pigtail 45 (FIG. 7).

Figure 2:
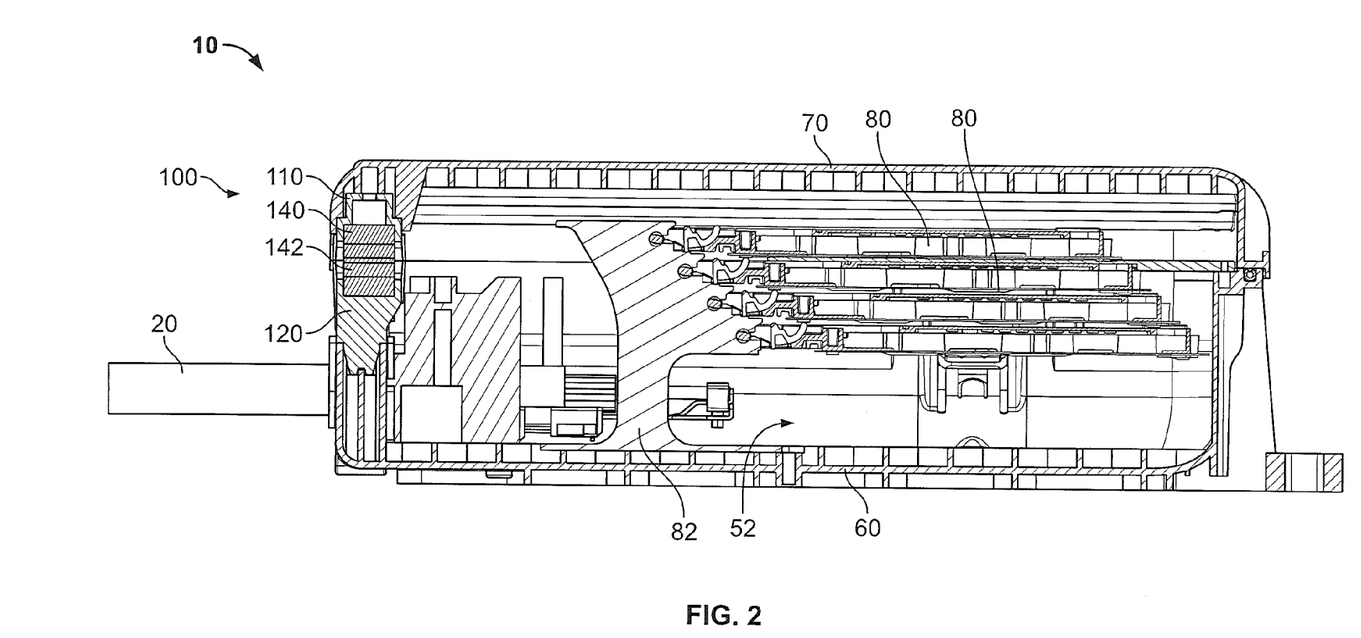
FIG. 2 is a cross-sectional view of the multi-drop closure system of FIG. 1 taken along the line 2-2 of FIG. 1, with the first endplate configuration.

The enclosure 50 includes a base 60 and a lid or cover 70. The base 60 and the cover 70 collectively define an enclosure chamber 52 (FIG. 2). As discussed in more detail below, the endplate assemblies 100, 200 also define a part of the chamber 52. The base 60 and the cover 70 are coupled together by a hinge 56A on one lateral side and a latch or clasp 56B on the opposing lateral side. The cover 70 can be pivoted about the hinge 56A between an open position allowing access for organizing or splicing optical fibers in the chamber 52 and a closed position extending over an access opening to the chamber 52 defined by the base 60. In the closed position, the interface between the base 60 and the cover 70 may be environmentally sealed so as to allow repeated access to the chamber 52 while maintaining an environmentally sealed space for splices when the cover 70 is in the closed position. The cover 70 can be secured in the closed position by clamps, latches, straps or any other suitable mechanisms. Strain relief clamps may be secured to the base 60 to secure the cables 20, 30.

Figure 4:
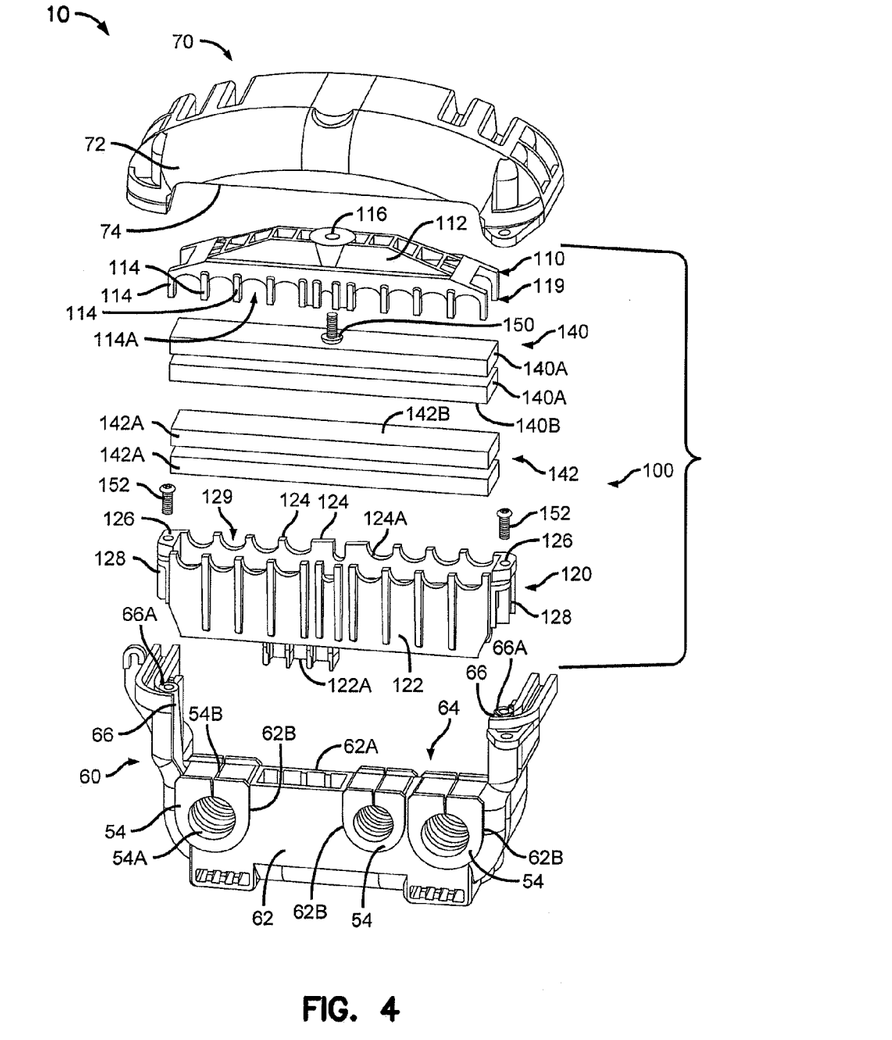
FIG. 4 is an exploded, fragmentary, perspective view of the multi-drop closure system of FIG. 1, with the first endplate configuration.

With reference to FIG. 4, the base 60 includes an end wall 62 having a locator slot 62A and cable slots 62B defined therein. The base 60 further defines an endplate slot 64. The base 60 has opposed side posts 66 each having a threaded fastener bore 66A therein.

The grommets 54 are mounted in the cable slots 62B. Each grommet 54 includes a port 54A and a radially and longitudinally extending slit 54B. The grommets 54 may be formed of an elastomeric or other suitable sealing material.

The cover 70 includes an end wall 72 having an endplate mount slot 74 defined therein.

The base 60 and the cover 70 may be formed of any suitable rigid or semi-rigid material. According to some embodiments, the base 60 and the cover 70 are formed of a polymeric material. According to some embodiments, the base 60 and the cover 70 are formed of a polymeric material selected from the group consisting of polypropylene, polyethylene, nylon, ABS and PMMA. According to some embodiments, the base 60 and the cover 70 are each unitarily molded and, according to some embodiments, are each unitarily injection molded.

With reference to FIG. 4, the endplate assembly 100 includes an upper gasket carrier 110, a lower gasket carrier 120, an upper gasket 140, a lower gasket 142, a top threaded fastener (e.g., self-tapping screw) 150, and side threaded fasteners 152.

The upper gasket carrier 110 includes a base 112 and a series of partitions 114 extending from the base 112. A series of slots 114A are defined between the partitions 114. A fastener hole 116 extends through the base 112. A downwardly facing gasket slot 119 is defined in the carrier 110.

The lower gasket carrier 120 includes a base 122 having a locator feature 122A. The lower gasket carrier 120 further includes a series of partitions 124 defining a series of slots 124A therebetween. Fastener holes 126 and side slots 128 are located at on either lateral side of the base 122. An upwardly facing gasket slot 129 is defined the carrier 120.

The gasket carriers 110, 120 may be formed of any suitable rigid or semi-rigid material. The gasket carriers 110, 120 may be formed of different material than the cover 70 and base 60. According to some embodiments, the gasket carriers 110, 120 are formed of a polymeric material. According to some embodiments, the gasket carriers 110, 120 are formed of a polymeric material selected from the group consisting of polypropylene, polyethylene, nylon, ABS and PMMA. According to some embodiments, the gasket carriers 110, 120 are each unitarily molded and, according to some embodiments, are each unitarily injection molded.

The upper gasket 140 may include two gasket layers 140A that are bonded together. The upper gasket 140 is seated in the gasket carrier slot 119 such that an engagement surface 140B faces downwardly. The gasket 140 is secured in the slot 119 by adhesive, for example.

The lower gasket 142 may include two gasket layers 142A that are bonded together. The lower gasket 142 is seated in the gasket carrier slot 129 such that an engagement surface 142B faces upwardly. The gasket 142 is secured in the slot 129 by adhesive, for example.

The gaskets 140, 142 may be formed of any suitable material such as, for example, compressible elastomeric foam.

With reference to FIG. 6, the endplate assembly 200 includes a faceplate 210 having a bottom edge portion 212, a top edge portion 214, and a locator feature 216 depending from the bottom edge portion 212. A plurality of connector ports 220 extend through the faceplate 210 and are each surrounded by an annular O-ring pocket groove 222. Side slots 224 and fastener holes 226 are provided on opposed ends of the faceplate 210.

The faceplate 210 may be formed of any suitable rigid or semi-rigid material. According to some embodiments, the faceplate 210 is formed of a polymeric material. According to some embodiments, the faceplate 210 is formed of a polymeric material selected from the group consisting of polypropylene, polyethylene, nylon, ABS and PMMA. According to some embodiments, the faceplate 210 is unitarily molded and, according to some embodiments, are each unitarily injection molded.

A hardened fiber optic connector (HFOC) or fiber optic connector assembly 240 (FIGS. 6 and 7) is mounted or seated in each port 220. Each connector assembly 240 includes a body 242, a front end connector 244, a back end connector 246, a threaded portion 242A, a cap 250, an O-ring 252, and a nut 254 mounted on each threaded portion 242A. The O-rings 252 are seated in the O-ring pocket grooves 222 to form an environmental seal about the connector assembly 240. The fiber optic connector assemblies 240 may include any suitable type of fiber optic connector. Suitable fiber optic connectors may include the DLX fiber optic connector available from ADC Telecommunications.

The enclosure system 10 may be assembled as follows in accordance with embodiments of the invention. The enclosure 50, the tray tower 82 and the splice trays 80 may be assembled in known or other suitable manner. For example, the splice trays 80 can be pivotally mounted on the tray tower 82 to cantilever therefrom.

The appropriate one of the endplate assemblies 100, 200 is chosen depending on the intended usage or functionality of the fully assembled fiber optic enclosure. More particularly, if it is desired to enable an installer to route drop cables directly into the chamber 52 rather than terminating at a fiber optic connector on the exterior of the enclosure 50, the endplate assembly 100 is installed. On the other hand, if it is desired to enable an installer to terminate a drop cable at a fiber optic connector on the exterior of the enclosure 50, the endplate assembly 200 is installed. According to some embodiments, this selection and the endplate assembly installing steps described below are executed by the manufacturer (i.e., at the factory) and delivered to the end user or installer preconfigured. According to some embodiments, this selection and the endplate assembly installing steps described below are executed by the installer in the field, for example. In the latter case, the installer may be provided with a kit or inventory including enclosures 50, endplate assemblies 100, and endplate assemblies 200 to be combined as needed.

Generally and with further details discussed below, according to some embodiments, an endless length of the main cable 20 is routed into and out of the enclosure 50. The main cable 20 may be coiled in the chamber 52. Typically, a section of the jacket 22 is removed to expose a bundle of buffer tubes (or ribbons) 24 containing optical fibers. When it is desired to terminate a branch cable 30 or a drop 40 to a fiber or fibers 26 of the cable 20, the enclosure housing 50 is opened or retained in the open position to provide access to the trays 80. The cable 30, 40 is trimmed and inserted into the enclosure through a suitable port. The installer can select and sever a corresponding fiber 26 from a selected buffer tube 24 (or ribbon). If necessary, the installer cuts the buffer tube 24 to access the fiber. The cut fiber 26 is routed to the branch fiber 36 or drop fiber 46 on the top side of a tray 80 and suitably spliced (e.g., fused or mechanically spliced) to the fiber 36, 46. The splice formed thereby may be mounted in the splice tray 80. The installer can thereafter close the cover 70.

In some cases, the manufacturer or installer may (e.g., at the time of the initial installation or subsequently) sever a buffer tube 24 or a fiber 26 and splice the fiber 26 as described above while leaving one or more of the other buffer tubes or fibers of the buffer tube (or ribbon) from which the fiber is separated uncut (i.e., the remaining fibers of the buffer tube or ribbon remain intact and are expressed).

In some cases, for example as described herein, one or more pigtails 45 are spliced to respective fibers 26 of the main cable 20 and are each plugged into the back of a respective connector assembly 240. This would typically be done in the field at the time the enclosure 50 is installed. The spliced pigtails 45 plugged into the backs of the connector assemblies 240 would then be waiting available for drop cables 40 to be plugged in (e.g., on a customer-by-customer basis when service is required). Optionally, the enclosure 50 may be manufactured, pre-assembled and provided to the installer as a "stubbed" version with the splicing of the pigtails 45 to the main cable 20 being done in the factory, with the pigtails 45 being plugged into the backs of the connector assemblies 240 at the factory as well.

The foregoing procedures can be used to splice additional drop cables to the main cable 20. While the splice is described above with respect to a single branch or drop fiber, the branch or drop cable may include multiple fibers that may be spliced to multiple ones of the main cable fibers, individually or as a mass splice. Multiple branch or drop cables may be spliced to the main cable fibers.

Having described exemplary uses of the enclosure, methods and apparatus for installing the cables 20, 30, 40 in the enclosure 50 will now be described in more detail.

With reference to FIG. 4, in order to configure the enclosure in a field splice configuration, the upper gasket carrier 110 is inserted into the slot 74 of the cover 70 and secured by a fastener 150 inserted through the hole 116 and into the cover 70. The lower gasket carrier 142 is inserted into the slot 64 such that the locator feature 122A seats in the locator slot 62A. The lower gasket carrier 120 is removably secured on the base 60 by screws 152 inserted through the holes 126 and the screw bores 66A. The gaskets 140, 142 may be mounted in the gasket carriers 110, 120 before or after mounting the gasket carriers 110, 120 on the enclosure 50.

In use, an endless length of the main cable 20 can be routed into and out of the chamber 52 through the ports 54A. More particularly, the cover 70 is opened and the screws 152 are removed from the holes 126 and the screw bores 66A to release the lower gasket carrier 120. The lower gasket carrier 120 is lifted out to expose the slits 54B in the grommets 54. Sections of the cable 20 can then be pressed down laterally through the slits 54B and the open top sides of the slots 62B to install the cable 20 in the ports 54A. Typically, the operator will pull the grommet 54 out of the selected cable slot 62B, insert the cable 20 into the grommet 54 (laterally through the slit 54B or axially through the port 54A), and then re-install the grommet 54 with the cable 20 therein in the cable slot 62B by pushing the grommet 54 laterally down into the cable slot 62B. The lower gasket carrier 120 is then re-inserted into the slot 64 such that the locator feature 122A seats in the locator slot 62A, and removably secured on the base 60 by the screws 152 inserted through the holes 126 and the screw bores 66A. The branch cable 30 can be routed into the chamber 52 through one of the ports 54A in the same manner. The installed lower gasket carrier will prevent lateral removal of the cables 20, 30 from the ports 54A through the slits 54B. Ordinarily, it will not be necessary to access the slits 54B again. However, the slits 54B can be exposed again using the foregoing technique, if desired. One or more fibers 36 of the branch cable 30 can be spliced to fibers 26 of the main cable 20 as discussed above.

When a user wishes to splice a fiber or fibers 46 of a drop cable 40 to the main cable 20, the user can open the cover 70 and make the desired splices in the chamber 52. The user can route the drop cable 40 between the gaskets 140, 142 and close the cover 70 onto the base 60 such that the gaskets 140, 142 compress about the drop cable 40 and the cable 40 seats in a pass through port 160 defined by the opposed and mated slots 114A, 124A. One or more additional drop cables 40 can be spliced and sealed in the same manner and each such cable 40 may be routed through a respective port 160 as shown in FIG. 1. In the illustrated endplate assembly 100, the centermost port 160 is adapted to receive a flat drop cable 40 whereas the remaining ports 160 are configured to receive flat or round drop cables 40 of varying diameters.

In order to configure the enclosure system 10 in a hardened drop configuration, the bottom edge portion 212 of the endplate assembly 200 is inserted into the slot 64 of the base 60 and the locator feature 216 is inserted in the slot 62A. The side posts 66 are received in the side slots 224. The endplate assembly 200 is removably secured on the base 60 by screws 228 inserted through the holes 226 and the screw bores 66A. When the cover 70 is closed, the upper edge portion 214 is received in the slot 74 of the cover 70.

In order to install the cables 20 and 40, the screws 228 can be removed from the holes 226 and the screw bores 66A and the endplate assembly can be lifted out of the base 60 generally as described above for the lower gasket carrier 120 to access the slits 54B of the grommets. Once the cable(s) 20 and/or 40 have been installed, the endplate assembly 200 can be reinstalled on the base 60.

When a user wishes to terminate a connectorized cable or optical fiber to the enclosure, the user can select a fiber optic connector assembly 240, remove the cap 250 therefrom, and engage the drop cable connector 48 with the front end connector 244 as shown in FIG. 5. It will be appreciated that, in order to complete the connection to another optical fiber in the enclosure 50 (e.g., a main cable fiber 26), the back end connector 246 must also be connected to a fiber within the enclosure. This may be accomplished in any suitable manner such as, for example, by use of a pigtail 45 (FIG. 7) having a fiber optic connector 49 and an optical fiber segment extending to a splice tray 80.

Thus, fiber optic enclosure systems according to embodiments of the present invention (e.g., the fiber optic enclosure system 10) can provide enhanced flexibility in use and/or manufacture. The fiber optic enclosure systems can thereby reduce the costs associated with manufacturing enclosures or maintaining a supply of enclosures in inventory.

While particular configurations of endplate assemblies have been described and illustrated, other configurations may be employed. For example, the endplate assembly may have more or fewer fiber optic connectors, drop cable slots of different shapes, sizes and arrangements, and/or different types of cable sealing gaskets.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A fiber optic splice enclosure system comprising:
    an enclosure defining an enclosure chamber;
    first and second endplate assemblies adapted to be interchangeably mounted on the enclosure to provide different respective configurations for connecting fiber optic cables to the enclosure;
    wherein the first endplate assembly includes a cable pass through port that is configured to terminate a fiber optic cable using a first termination method, the first termination method includes passing the fiber optic cable through the cable pass through port into the enclosure chamber and splicing an optical fiber of the fiber optic cable within the enclosure chamber; and the second endplate assembly includes an optical fiber connector that is configured to terminate a fiber optic cable using a second termination method different form the first termination method, the second termination method includes terminating an optical fiber of the fiber optic cable to the optical fiber connector;
    wherein the first and second endplate assemblies are each configured to connect a drop fiber optic cable to the enclosure; and the enclosure includes a main port configured to receive a main fiber optic cable into the enclosure chamber;
    wherein the main port has a side opening on a lateral side thereof to enable a section of the main fiber optic cable to be inserted laterally into the main port, and each of the first and second endplate assemblies, when mounted on the enclosure, closes the side opening of the main port to prevent lateral removal of the main fiber optic cable from the main port; and
    wherein a splice tray is disposed in the enclosure chamber.

2. The fiber optic splice enclosure system of claim 1, wherein the first endplate assembly includes first and second resilient gaskets on opposed sides of the pass through port, and the first and second resilient gaskets are adapted to receive the fiber optic cable therebetween to form an environmental seal about the fiber optic cable.

3. The fiber optic splice enclosure system of claim 1, including a resilient grommet mounted in the main port to form an environmental seal about the main fiber optic cable.

4. The fiber optic splice enclosure system of claim 1, wherein the enclosure includes:
    an enclosure cover and an enclosure base relatively movable between an open position and a closed position defining the enclosure chamber;
    the first endplate assembly includes an upper member mountable on the enclosure cover for movement therewith, and a lower member mountable on the enclosure base to move therewith; and
    the upper and lower members are movable with the enclosure cover and the enclosure base, respectively, to close about the fiber optic cable when the enclosure is transitioned into its closed position.

5. The fiber optic splice enclosure system of claim 4, wherein the upper member includes:
    an upper gasket carrier and a first resilient gasket mounted on the upper gasket carrier;
    the lower member includes a lower gasket carrier and a second resilient gasket mounted on the lower gasket carrier; and when the enclosure is in its closed position with a section of the fiber optic cable therebetween, the first and second resilient gaskets form an environmental seal about the fiber optic cable.

6. The fiber optic splice enclosure system of claim 5, wherein the upper and lower gasket carriers each define a plurality of open slots; and when the enclosure is in its closed position, the open slots of the upper gasket carrier combine with the open slots of the lower gasket carrier to form a plurality of fiber optic cable pass through ports.

7. The fiber optic splice enclosure system of claim 1, wherein the second endplate assembly includes:
    an endplate body; and
    an optical fiber connector mounted on the endplate body and configured to terminate an optical fiber of the fiber optic cable.

8. The fiber optic splice enclosure system of claim 7, wherein the second endplate assembly includes a plurality of optical fiber connectors mounted on the endplate body and each configured to terminate a respective optical fiber.

9. The fiber optic splice enclosure system of claim 7, including a pigtail connector connected to the optical fiber connector and an optical fiber segment extending from the pigtail connector and into the enclosure chamber.

10. A method for using a fiber optic splice system, comprising:
    providing a fiber optic splice enclosure system, the fiber optic splice enclosure system including:
        an enclosure defining an enclosure chamber; and
        first and second endplate assemblies adapted to be interchangeably mounted on the enclosure to provide different respective configurations for connecting fiber optic cables to the enclosure;
    selecting one of the first and second endplate assemblies; and
    mounting the selected one of the first and second endplate assemblies on the enclosure; wherein the first and second endplate assemblies are each configured to connect a drop fiber optic cable to the enclosure; the enclosure includes a main port configured to receive a main fiber optic cable into the enclosure chamber, the main port having a side opening on a lateral side thereof;
    inserting a section of the main fiber optic cable laterally into the main port; and thereafter
    mounting the selected one of the first and second endplate assemblies on the enclosure such that the selected one of the first and second endplate assemblies closes the side opening of the main port to prevent lateral removal of the main fiber optic cable from the main port;
    wherein the first endplate assembly is configured to terminate a fiber optic cable using a first termination method, and the second endplate assembly is configured to terminate a fiber optic cable using a second termination method different from the first termination method.

11. The method of claim 10, wherein the steps of selecting one of the first and second endplate assemblies and mounting the selected one of the first and second endplate assemblies on the enclosure are executed by an installer proximate the time of terminating a fiber optic cable at the enclosure.

12. The method of claim 10, wherein the first endplate assembly includes:
   a cable pass through port;
   the first termination method includes passing the fiber optic cable through the cable pass through port into the enclosure chamber and splicing an optical fiber of the fiber optic cable within the enclosure chamber;
   the second endplate assembly includes an optical fiber connector; and
   the second termination method includes terminating an optical fiber of the fiber optic cable to the optical fiber connector.

13. The method of claim 10, wherein the enclosure includes:
   an enclosure cover and an enclosure base relatively movable between an open position and a closed position defining the enclosure chamber;
   the first endplate assembly includes has an upper member mountable on the enclosure cover for movement therewith, and a lower member mountable on the enclosure base to move therewith;
   the upper and lower members are movable with the enclosure cover and the enclosure base, respectively, to close about the fiber optic cable when the enclosure is transitioned into the closed position;
   the upper member includes an upper gasket carrier and a first resilient gasket mounted on the upper gasket carrier;
   the lower member includes a lower gasket carrier and a second resilient gasket mounted on the lower gasket carrier; and
   the method includes moving the enclosure to the closed position with a section of the fiber optic cable therebetween, to capture the section of the fiber optic cable between the first and second resilient gaskets such that the first and second resilient gaskets form an environmental seal about the fiber optic cable.

14. The method of claim 13, wherein the second endplate assembly includes:
   an endplate body; and
   an optical fiber connector mounted on the endplate body; and the method includes:
   selecting and mounting the second endplate assembly on the enclosure; and
   connecting an optical fiber of the fiber optic cable to the optical fiber connector.

\* \* \* \* \*